Figure 7:
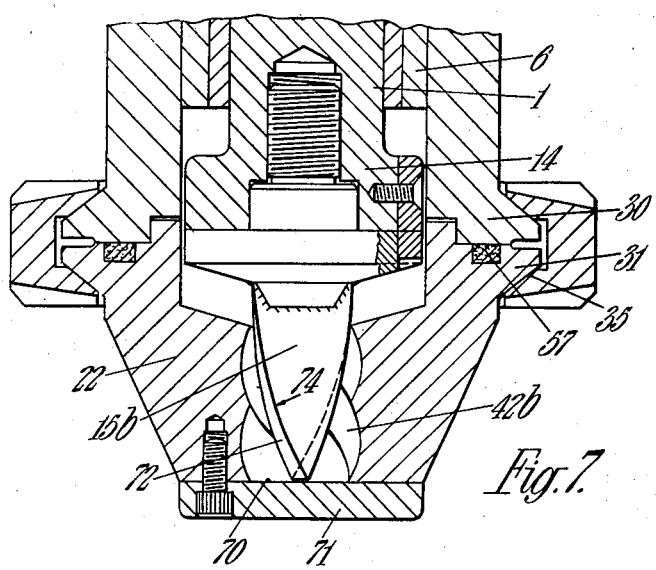

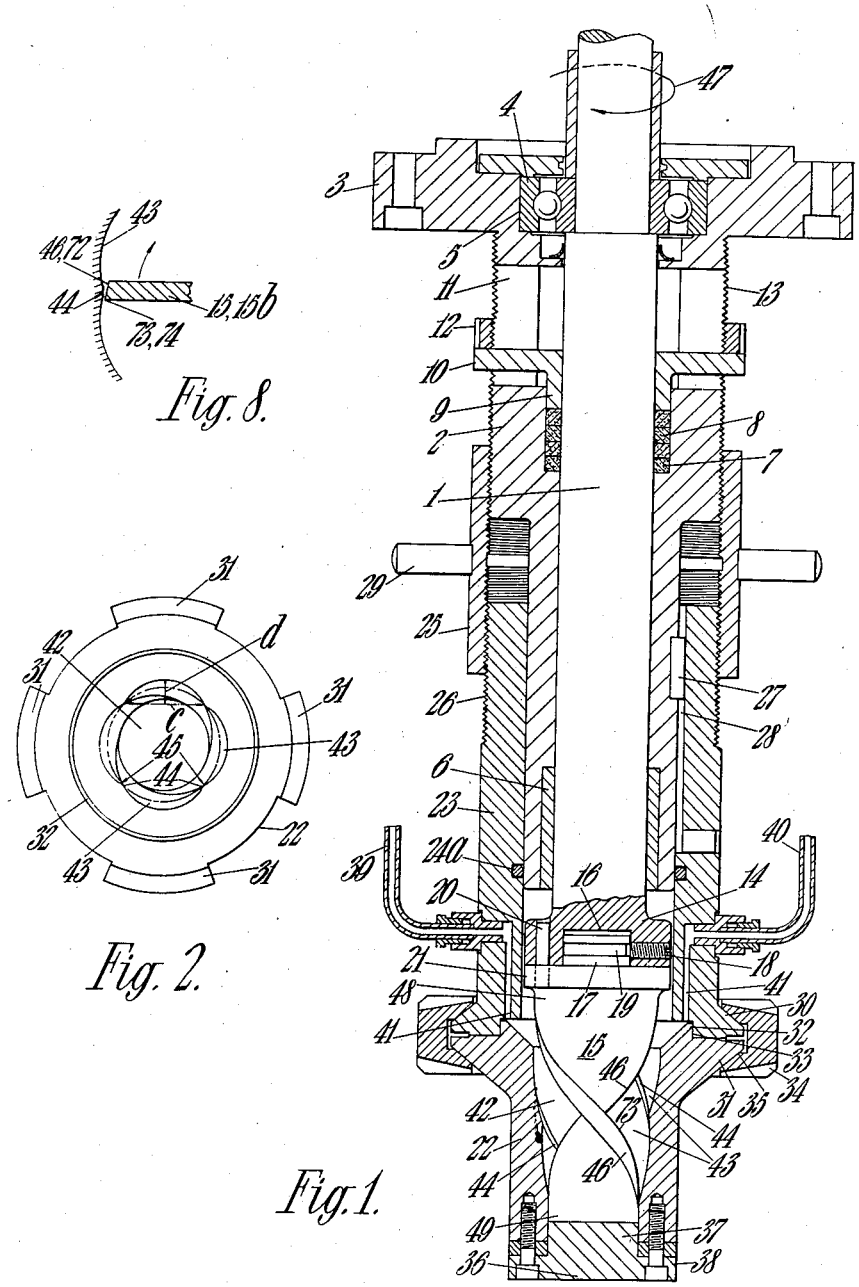

United States Patent Office 2,977,098
Patented Mar. 28, 1961

2,977,098

MIXING MACHINES FOR RUBBERS AND PLASTIC SUBSTANCES

William Ferguson Watson and Darrell Wilson, Welwyn Garden City, England, assignors to Baker Perkins Limited, Peterborough, England Filed June 18, 1958, Ser. No. 742,929

Claims priority, application Great Britain June 21, 1957

11 Claims. (Cl. 259—108)

This invention relates to mixing machines for the treatment of plastic or coherent substances, such as rubbers, and has for its aim the provision of an improved construction of mixing machine which is mechanically simple and robust while giving high efficiency of mixing.

It is a further aim of the invention to provide an improved mixing machine for plastic or coherent substances which enables additives to be introduced into the mass under treatment while it is being processed in the mixing machine.

A still further aim of the invention is to provide an improved construction of mixing machine for plastic or coherent substances, which will function satisfactorily even though its mixing chamber is loaded to only a fraction of its total capacity.

The invention consists in a mixing machine for plastic or coherent substances comprising a housing forming a mixing chamber of basically circular cross-section totally closed at one end, and, accommodated concentrically within the chamber, an insert or blade relatively movable with respect to, and extending co-axially of, the chamber towards the closed end and having at least one diametric dimension approaching the corresponding dimension of the chamber whereby only a restricted clearance exists between the insert and the chamber wall, the surface of the chamber wall being formed with concave flutes, grooves or like configurations extending generally longitudinally of the chamber and the formation of the said flutes or grooves, and/or the formation of the insert being such as to impart to the material under treatment a component of movement, as a result of a relative rotational displacement between the insert and the chamber towards the closed end of the chamber. By this arrangement the material fed to the chamber experiences, during mixing, increments of orbital movement about the axis of the chamber, movement axially towards the closed end of the chamber and, in consequence, back-flow or displacement from the region of the closed end axially away from the closed end, concomitant internal shearing action taking place during these movements or displacements. The above arrangement of a single insert disposed co-axially in the chamber produces a balanced load unlike conventional mixing machines having two or more mixing rotors which generate large cyclic thrusts as the eccentric portions of the rotors approach one another. For this reason there is very much less bending stress imposed on the insert and any shaft or equivalent means by which the insert is mounted and in consequence less radial load on any bearings and the like. The drive for the mixing machine can be very simple and no glands are normally required.

A further advantage is that it is unnecessary to hold the material down to work as is often the case with internal mixing machines where a ram or other device is generally required. For this reason, inter alia, the mixing machine can operate effectively on only a fraction of its full charge and also materials can be added as and when required while mixing is taking place.

According to the invention the chamber may be of generally cylindrical or of generally frusto-conical form, in the latter case having a relatively slow taper, preferably not more than such as to include an angle of more than 60° at the projected cone apex. The frusto-conical form of chamber is particularly convenient since it permits the clearance between the insert and chamber to be readily and infinitely varied between limits by a relative axial displacement between the insert and chamber, thus giving scope for variable working of the material under treatment. The flutes or grooves formed on the surface or wall of the chamber may extend helically of the chamber axis or may extend rectilinearly along lines contained by planes also containing the axis of the chamber, that is, they may have no circumferential displacement about the chamber axis. Each flute or groove may be continuous or interrupted and, in the latter case, the interrupted portions of each flute or groove may be aligned or staggered.

The characteristics and sectional configuration of the flutes or grooves are preferably such as to avoid any relatively sharp changes in section liable to create pockets or zones in which material may stagnate, and to this end the flutes or grooves preferably have a transverse section which is a gradual curve, each flute or groove being shallow relative to the diameter of the chamber, for example, having a depth to chord length ratio of not more than about 1:3 and preferably not more than 1:4. It is preferred that a slight land is provided between adjacent flutes or grooves, the land normally comprising the true surface of the cylinder or cone of the chamber wall; the edges of the lands, that is the lines of intersection between the true surface of the chamber wall and the flute or groove surfaces, may be rounded or blunted.

In the case of helical flutes or grooves, the lead is preferably not less than 30° to the transverse plane containing the axis of the chamber and it is preferred to provide at least more than one flute or groove, preferably two or multiples of two, the leads thereof, in the case of a plurality of flutes or grooves, being such, with respect to the axial length of the chamber that the projected start of one flute or groove wholly overlaps the termination of the preceding flute or groove. The helix angle of the helical flutes or grooves may not be constant, and in the case of a conical chamber the helix angle will not be constant if the helix is cut by normal methods, that is on a cylindrical basis. Further, in order to avoid "dead" pockets, where material may stagnate, the flutes or grooves, preferably run out at the level of the base of the chamber (i.e. the closed end) to the true surface of the cylinder or cone of the chamber. Additionally or alternatively, in order to avoid "dead" pockets, the base of the chamber, which otherwise may be flat, is internally of concave hemispherical form or formed with a substantial radius to blend the side wall surface into the base, the insert being shaped at its lower end to conform in profile with the section of the base.

The insert may be laminar or formed in a cylindrical base. When of laminar form the insert may be twisted about its axis to afford a screw effect or it may be flat; in the latter case, however, the chamber with which the insert co-operates must be of the type having helical flutes or grooves so that the desired baseward movement of the material is achieved. Alternatively the shape of the insert may be of basically flat laminar form, the lateral or peripheral edges of which are formed with spaced grooves disposed so as to lie on a helix co-axial with the insert axis and, preferably, progressively diminishing in depth towards the bottom end of the insert, These edge grooves may be extended forwardly from the leading edge of the insert faces as run-out grooves across the face of the insert lamina to half way or beyond the insert face width or as constant depth grooves extending fully across the width of the insert face and in a direction maintaining substantially the same helix angle as that of the helix on which the edge grooves lie. The edge grooves and the extensions thereof promote movement of the material under treatment towards the side of the mixing chamber. Further the laminar form of the insert preferably increases in thickness towards the insert root, whereat it has a basically cylindrical section portion on which portion the edge grooves develop into a continuous helical groove around the entire circumference of the root portion, which thus forms a closure for the top of the mixing chamber, the continuous helical groove serving to urge the material in the direction of the base of the chamber.

In the case of an insert having a cylindrical basis, flutes or grooves are formed therein, so as to afford a grip on the material in the chamber to cause its rotary or orbital displacement and in order to impart to it the desired baseward movement thereof the flutes or grooves may be helically formed. The lead on the insert (measured at a peripheral edge) may be from 90° to say 30° to the transverse plane of the axis of the insert the 90° lead comprising a flat, that is untwisted, laminar, or a rectilinearly and axially fluted cylindrical insert. However, where a helically formed insert is used in conjunction with a helically fluted or grooved chamber the lead on the insert and the lead of the flutes or grooves on the chamber wall are preferably of substantially the same pitch, and while it is preferred that the senses of the helices of the twist, or flutes or grooves, on the insert and the flutes or grooves on the chamber are of opposite hands, the helices may be of the same sense provided that the leads are differential in order to give the desired resultant baseward component of movement to the material in the chamber due to the inter-action thrust between the peripheral edges of the insert and the flutes or grooves of the chamber wall. Where the insert is of the form having a cylindrical basis on which helical flutes or grooves are formed, it is preferred that the number of flute or groove starts on the chamber wall is a multiple of the number of flute or groove starts on the insert. As in the case of the helical fluting or grooving of the chamber wall, the helix angle of the twist, or of the flutes or grooves, on the insert need not be constant. It is also preferred that the peripheral edges of the insert are progressively relieved from their trailing edge to their leading edge so that a tapering lead-in is provided between the peripheral edge of the laminar insert and the wall of the chamber.

The chamber and the insert may be provided with conduit or equivalent means for the purpose of heat transfer, for example, heating or cooling mediums may be circulated around the chamber and through the insert.

For unloading the chamber on the completion of mixing, the insert may be totally withdrawn and the material scooped out, or the base of the chamber may have a normally closed aperture therein for unloading purposes or may be displaceable as a whole in order to permit egress of the material. Alternatively by reversal of the drive the chamber will be unloaded by an action opposite to that of the mixing operation, or if suitable, the chamber may be tilted or inverted for unloading purposes.

In order to effect the mixing function of the device it is necessary to provide for a relative rotation between the insert and the chamber about their common axis and it is preferred with small capacity machines to operate with the chamber stationary and with the insert rotating. To the same end, the chamber may be the rotated member and the insert the stationary member. Alternatively both the insert and the chamber may be rotated oppositely and simultaneously.

Figure 3:
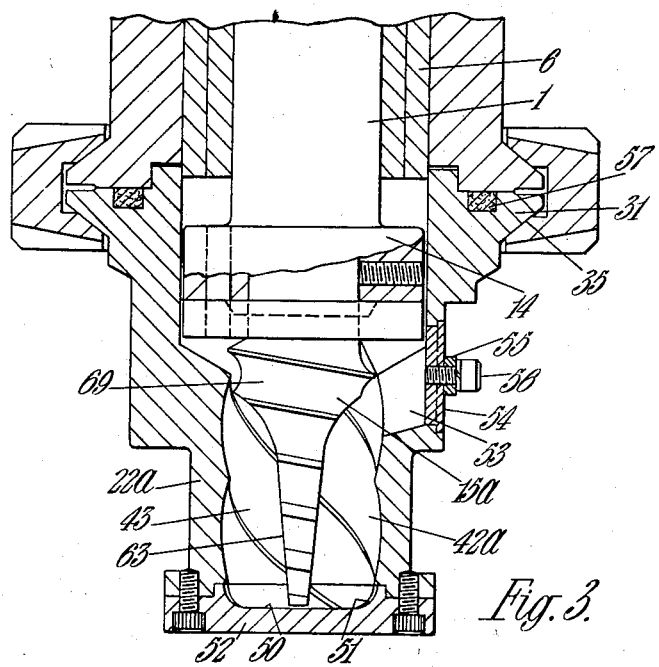
Figure 6:
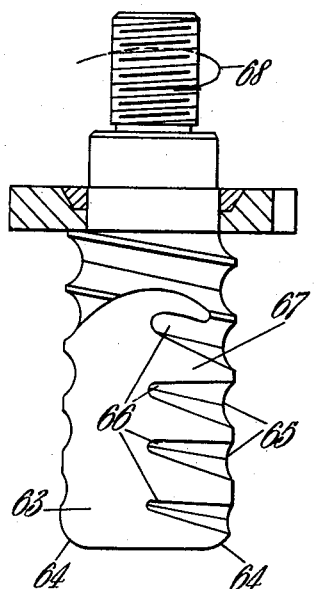
Figure 5:
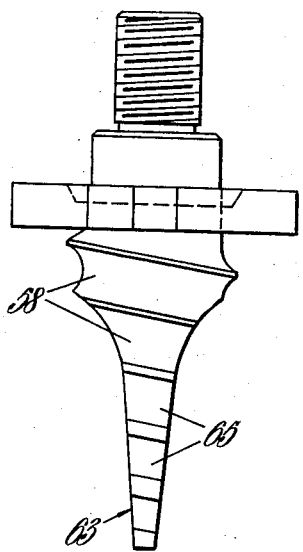
Figure 4:
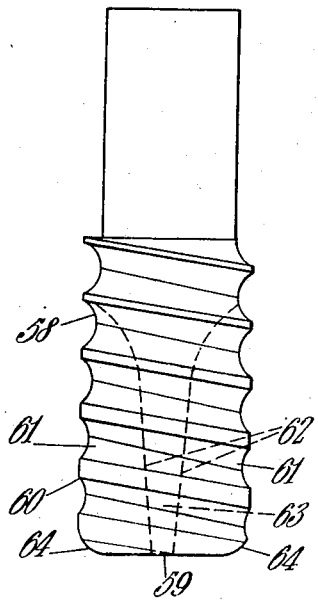

In the accompanying drawings:

Figure 1 is a sectional side elevation of one form of mixing machine according to the present invention, Figure 2 is a plan view of the mixing chamber housing shown in Figure 1 removed from the machine, Figure 3 is a sectional side elevation of a modified form of mixing chamber and mixing blade (or chamber insert), Figures 4, 5 and 6 are side elevations of the mixing blade (or chamber insert) of Figure 3 showing its mode of manufacture, Figure 7 shows a sectional side elevation including a still further alternative form of mixing blade (or chamber insert), and Figure 8 is a fragmentary plan diagram in section showing the formation of the peripheral edge of a mixing blade (or chamber insert) with respect to the mixing chamber wall surface.

In carrying the invention into effect according to one mode by way of example, a mixing machine will be described in which the mixing chamber is stationary and the insert, comprising the mixing blade, is rotatably driven.

A drive shaft 1 is carried in a mounting sleeve 2 which is provided at its upper end with a circular flange 3 by which it can be bolted to a supporting structure not shown. Near its upper end, the shaft 1 is mounted in a ball bearing race 4 housed in a recess 5 in the top end of the sleeve 2 and above the race 4, the shaft 1 is provided with means (not shown) such as a gear wheel for connecting the shaft to its source of driving power. At the lower end of the sleeve 2, the shaft 1 passes through a bearing 6, such as a carbon dry-sleeve bearing and between the bearing 6 and the race 4, adjacent the latter, a stuffing box 7 is provided together with packing 8 and a gland ring 9 to make an air-tight seal between the shaft 1 and sleeve 2. The gland ring 9 has a pair of lugs 10 which project diametrically therefrom through slots 11 formed in the wall of the sleeve 2 and a clamping ring 12 is threaded on to an external thread 13 on the outer wall of the sleeve 2 to engage the gland ring lugs 10 and cause the packing 8 to be adequately compressed.

At its lower end, the shaft 1 has an enlarged head 14 on which the insert 15, hereinafter called the mixing blade 15, is mounted. To this end, an axial recess 16 is formed in the shaft head 14 which accommodates a central spigot 17 on the mixing blade 15 and retains it by means of a set screw 18 engaging a groove 19 in the spigot 17. The mixing blade 15 is locked against rotation relative to the shaft 1 by a pin 20 passing through the head 14 and the mixing blade hub 21, the pin 20 further acting as a safety device which will shear should the resistance encountered by the mixing blade 15 become too high or should the mixing blade 15 become obstructed.

A mixing chamber housing 22 is mounted so as to encircle the mixing blade 15 and be held against axial or rotational movement. The mounting, as shown, comprises an elongated sleeve 23 which encircles the shaft mounting sleeve 2, which over its lower portion 24 is of reduced diameter, and is axially movable thereon, an air-tight sealing ring 24a being provided between the adjacent surfaces of the two sleeves. The sleeve 23 and shaft mounting sleeve 2 are restrained from free axial relative movement by means of a double and oppositely threaded collar 25 which is in threaded engagement with the threads 13 on the sleeve 2 and with threads 26 on the sleeve 23, and is restrained from rotation by means of a key 27 embedded in the sleeve 2 and projecting into a keyway 28 in the inner surface of the sleeve 23. The collar 25 provides for upward and downward movement of the sleeve 23 for axially adjusting the position of the mixing chamber housing 22 relative to the mixing blade 15, and to facilitate rotation of the collar 25 for this purpose capstan bars 29 are provided on the collar 25.

At its lower end, the sleeve 23 is formed with a plurality of circumferentially spaced projecting lugs 30 and the mixing chamber housing 22 is similarly formed with lugs 31 (see Figure 2) around its upper margin and also has an annular shoulder 32 which engages in a counter-bore 33 at the end of the sleeve 23 to centralise the mixing chamber housing 22 on the end of the sleeve 23. In order to clamp the mixing chamber housing 22 to the end of the sleeve 23, a clamping ring 34 is provided, the internal channel 35 of which is circumferentially interrupted to correspond with spacing of the lugs 30 and 31 on the sleeve 23 and mixing chamber housing 22 whereby the clamping ring 34 and the lugs 30 and 31 engage one another in a so-called "bayonet" type of fixing. By this means, the mixing chamber housing 22 can be quickly removed and replaced.

While the mixing chamber housing 22 may be unloaded by removing the housing bodily from the end of the sleeve 23 by releasing the clamping ring 34, it is convenient to provide for unloading through the base of the housing. For this reason, the base of the housing is provided by a separate closure member 36 having a plug portion 37 which fits into the base of the housing and a peripheral flange 38 by which the closure member 36 may be bolted to the housing 22. The provision of a removable base also facilitates cleaning of the mixing chmber.

In some instances it may be necessary or desirable to treat substances in the mixing chamber under vacuum conditions, or under pressure or in the presence of a certain gas, e.g. an inert gas, and gas inlet and outlet conduits 39 and 40 are provided which connect up with the mixing chamber 22 by ducts 41 in the wall of the sleeve 23.

Figure 1 and the above description concern one form of assembly for mounting and operating the relatively movable mixing means according to the present invention, but any other suitable assembly may be employed. Hereinafter description will be confined to details of the embodiments of the mixing means themselves which may be used with the above described or other suitable assemblies.

The mixing chamber 42 proper in the mixing chamber housing 22 is of generally frusto-conical form with its axis co-axial with the axis of the shaft 1 and mixing blade 15 and has a relatively slow taper, e.g. including an angle of about 15° at the theoretical cone apex as illustrated and preferably not exceeding a cone apex included angle of more than 60°. The mixing chamber wall surface has formed thereon a plurality of flutes or grooves 43 extending helically of the chamber axis, there being four flutes or grooves 43 spaced around the chamber 42 as illustrated, but this number may vary, although it is preferred to have an even number of flutes or grooves on the mixing chamber wall so as to give equal thrusts on both edges of a two-edged mixing blade 15 as is shown.

The characteristic and sectional configuration of the flutes or grooves 43 avoid any sharp changes in section liable to create pockets in which material under treatment may stagnate so that the flutes or grooves 43 (see also Figure 2) have a transverse section which is a gradual curve or arc, the depth of which $d$ is relatively shallow, e.g. a depth $d$ to chord $c$ ratio of not more than about 1:4. Further a slight land 44 is provided between adjacent flutes or grooves, the lands 44 comprising the true surface of the conical frustrom of the mixing chamber wall, and the edges 45 of the lands 44, that is, the lines of intersection between the true surface of the chamber wall and the flute or groove surfaces, may be rounded or blunted.

The lead of the helical flutes or grooves 43 is preferably not less than about 30° to the transverse plane containing the axis of the mixing chamber 42, the lead in Figure 1 being about 45°. In a frusto-conical mixing chamber the lead of the helix cannot be constant if the helix is cut by normal methods as can be the case with a cylindrical chamber described hereafter. The lead in combinatiton of the number of flutes or grooves should be such that, having regard to the axial length of the mixing chamber, the projected start of one flute or groove overlaps the termination of the preceding flute or groove.

The mixing blade 15 is of originally flat laminar form twisted about its axis so that its edges 46 follow a helical path, which in the form shown in Figure 1 has substantially the same helix angle as the flues or grooves 43 of the mixing chamber 42 but is of the opposite sense or hand. The mixing blade may, however, be formed with a helix of the same sense or hand as the flutes or grooves of the mixing chamber provided that the leads of the two helices are different in order to give to the material under treatment a component of movement towards the base of the mixing chamber. In the case of the mixing blade 15 in Figure 1 the helices are of different senses or hands as mentioned above and the mixing blade is rotated so that it applies to the material the desired baseward component of movement, i.e. the mixing blade is rotated in the direction of the arrow 47 shown at the top of the shaft 1.

Due to the frusto-conical shape of the mixing chamber 42 the mixing blade 15 is correspondingly formed, that is, the laminar blank from which the blade is twisted is trapezoidal in shape and narrows in width from top to bottom in conformity with the conical taper of the chamber 42. Further in the form shown in Figure 1, the blade 15 has a full 360° twist so that its top end portion 48 is substantially coplanar with the bottom end portion 49.

Due to the providing of a tapering mixing chamber 42 and mixing blade 15, the clearance between the edges 46 of the mixing blade 15 and the lands 44 between the flutes or grooves 43 of the mixing chamber 42 can be readily adjusted by relative axial adjustment of the mixing chamber housing 22 and mixing blade 15. This is accomplished in the assembly shown in Figure 1 by axial displacement of the sleeve 23 carrying the mixing chamber housing 22 by operation of the collar 25 by the capstan bars 29, as mentioned above. While the flutes or grooves 43 may be of substantially constant depth $d$ (see Figure 2) over their length, it is preferred to reduce the depth of the flutes or grooves progressively towards the base of the mixing chamber 42 in order to reduce the creation of "dead" pockets at the base of the chamber. Thus the section of the chamber 42 at or closely adjacent the level of the chamber base is a true and complete circle.

In Figure 3 of the drawings, there is shown a modified form of mixing chamber and mixing blade construction, according to the present invention. Apart from there being a different construction of mixing blade 15a, which will be described below, the mixing chamber 42a is generally cylindrical as compared with the frusto-conical shape of the chamber shown in Figure 1, that is, the lands 44 between the flutes or grooves 43 lie on the surface of a cylinder. This shape of mixing chamber may be used with the twisted lamina construction of mixing blade 15 used in the Figure 1 construction, the blade 15 having been formed from a rectangular lamina, as opposed to a tapering lamina, in order to correspond with the cylindrical shape of the mixing chamber 42a. Further, the mixing chamber 42a has a base wall surface 50 which is formed with a substantial peripheral radius 51 so as to blend the base surface 50 with the side wall surface of the mixing chamber. To this end a base closure member 52 is secured to the bottom of the mixing chamber housing 22a to provide the base surface 50 and peripheral radius 51. This modification may also be incorporated in the Figure 1 construction, the bottom corners of the mixing blade 15 being correspondingly radiussed to conform with the radius 51 at the chamber base. Still further, the mixing chamber housing 22a may be provided with an orifice 53 for charging the mixing chamber 42a, or adding material during treatment. The orifice 53 is normally closed by a plug 54 secured in place by a strap 55 held to the housing 22a by bolts 56 on either side of the plug 54. The charging orifice 53 and closure therefore may also be incorporated in the Figure 1 construction.

In Figure 3 a gasket 57 is interposed between the contacting surfaces of the mixing chamber housing 22a and the end of the mounting sleeve 23 and this may also be incorporated in the Figure 1 construction if desired.

The mixing blade 15a is substantially laminar over most of its length, but is not twisted as is the mixing blade 15 of Figure 1. The shape of the mixing blade 15a is best described by reference to one mode of manufacture, see Figures 4, 5 and 6. From cylindrical stock, see Figure 4, a helical groove 58 is formed such that the groove depth is progressively reduced towards the base 59 of the blade blank 60, that is the root diameter of the groove 58 progressively increases towards the base 59. The grooved blade blank 60 next has the portions 61 lying outward of the dotted lines 62 milled away to provide a blade blank lamina 63, see Figure 5, the plane of the lamina 63 being chosen so that the full radius as at 64, see Figure 4, is preserved at the lamina bottom corners. The blade blank lamina 63, so produced, finally has the portions 65 remaining of the groove 58 extended, while maintaining substantially the same helix angle as the original groove 58, as run-out grooves 66 half-way across each face 67 of the lamina (see Figure 6) at the leading edge of the lamina having regard to its direction of rotation in use, see arrow 68 in Figure 6. If desired the run-out grooves 66 may extend more than half way across the faces 67 of the mixing blade lamina or may extend at substantially constant depth fully across the width of the lamina faces (not shown). The profile of the lamina 63, as shown in Figure 5, is such that the root portion 69 of the blade has the full circular section of the original blade blank 60 shown in Figure 4, so that the root portion 69, and the part of the groove 58 thereon, can comprise a closure to the upper end of the mixing chamber 42a and the part of the groove 58 thereon by its helical form serves to urge material towards the base of the chamber. Where a mixing blade 15a as shown in Figures 3 to 6 is required to be used in a frusto-conical mixing chamber, the blade blank 60 will itself be of corresponding frusto-conical form and not cylindrical.

In Figure 7 there is shown a mixing blade 15b of the same type as in Figure 1 but having only a half twist (100°). The blade 15b is shown in a basically cylindrical fluted mixing chamber 42b as shown in Figure 3, but having a flat base wall 70 provided by a removable closure plate 71. The mechanism is otherwise similar to that previously described. The half twist blade 15b shown above may also be formed from a tapering (trapezoidal) blank for use with a frusto-conical mixing chamber.

In the case of the mixing blade 15 of Figure 1 or 15b of Figure 7 it is preferred slightly to relieve the peripheral edges 46 of blade 15 and 72 of blade 15b progressively from their trailing edges, see edges 73 in Figure 1 and edge 74 in Figure 7. This relieving is shown diagrammatically in Figure 8 and provides a lead-in for the material between the peripheral edges of the blades and the adjacent wall surface of the mixing chamber.

The above described embodiment of mixing machine, according to the present invention does not require to be mounted with the axis of the mixing blade vertical and this axis may be disposed at any angle as required, and, in particular, with the axis of the mixing blade horizontal.

We claim:

1. A mixing machine for adherent substances comprising support means; a housing member mounted on said support means and forming a mixing chamber of basically circular cross-section having helically fluted walls and at least one closed end; a substantially laminar mixing blade member having a length corresponding substantially to the length of said chamber and having a diametric dimension corresponding substantially to the diametric dimension of said chamber; means mounting said blade member coaxially with and concentrically within said chamber and for rotation relative thereto; and means connected with at least one of said members for rotating it, the flutes of said chamber being inclined to the axis of said chamber in a direction such that relative rotation of said blade member and said housing member causes a substance in said chamber to have a component of movement towards the closed end of the latter.

2. A mixing machine as claimed in claim 1 wherein the chamber is of generally cylindrical form.

3. A mixing machine as claimed in claim 1 wherein the chamber is of generally frusto-conical form tapering towards its said closed end.

4. A mixing machine as claimed in claim 1 wherein the flutes of said chamber walls are progressively reduced in depth towards the closed end of the chamber.

5. A mixing machine as claimed in claim 1 wherein said blade member is helically fluted and wherein the lead of the helix of the blade member flutes is substantially the same as that of the chamber flutes but of the opposite hand.

6. A mixing machine as claimed in claim 1 wherein said blade member is helically fluted and wherein the helix of the blade member flutes is of the same hand as that of the chamber flutes but has a lead differential.

7. A mixing machine as claimed in claim 1 wherein the blade member is a flat lamina subjected to a 180° twist over its axial length.

8. A mixing machine as claimed in claim 1 wherein the blade member is a flat lamina subjected to a 360° twist over its axial length.

9. A mixing machine as claimed in claim 1 wherein said blade member is helically fluted and wherein the flutes diminish in depth progressively towards the bottom end of said blade.

10. A mixing machine as claimed in claim 1 wherein the lateral edges of the blade member are progressively relieved from their trailing edges to their leading edges so that a lead-in for the substance under treatment is provided between the said lateral edges and the walls of the chamber.

11. A mixing machine for adherent substances comprising support means; a housing member mounted on said support means and forming a mixing chamber of basically circular cross-section having helically fluted walls and at least one closed end; a substantially laminar, helically fluted mixing blade member having a diametric dimension corresponding substantially to the diametric dimension of said chamber, the end of said blade member adjacent the open end of said chamber corresponding substantially in size and shape to the size and shape of the open end of said chamber to form a closure therefor; means mounting said blade member in said chamber and for rotation relative thereto; and means connected with at least one of said members for rotating it, the flutes of said chamber and said blade member being of opposite hand but so related to one another that rotation of said one of said members relatively to the other causes a substance in said chamber to have a component of movement towards the closed end of the latter.

References Cited in the file of this patent

UNITED STATES PATENTS

| | | |
|---|---|---|
| 1,762,094 | Goetz | June 3, 1930 |
| 2,200,997 | Royle | May 14, 1940 |
| 2,581,031 | Kruzik | Jan. 1, 1952 |
| 2,694,224 | Rhodes | Nov. 16, 1954 |